United States Patent [19]

Mabey et al.

[11] 4,032,021
[45] June 28, 1977

[54] DEPALLETIZERS

[75] Inventors: Michael David Mabey, Bishampton, near Pershore; James Malcolm Foster, Harrowgate, both of England

[73] Assignee: Depallorator Corporation Limited, Ireland

[22] Filed: Aug. 22, 1975

[21] Appl. No.: 607,064

[30] Foreign Application Priority Data

Aug. 23, 1974  United Kingdom ............ 37206/74

[52] U.S. Cl. .......................... 214/8.5 F; 214/8.5 G
[51] Int. Cl.² ........................................ B65G 59/02
[58] Field of Search .......... 214/622, 623, 624, 625, 214/89, 6 G, 8.5 R, 8.5 A, 8.5 F, 8.5 G, 16.4 A, 16.1 DB; 221/106, 111, 107, 108

[56] References Cited

UNITED STATES PATENTS

| | | | |
|---|---|---|---|
| 3,206,041 | 9/1965 | McGrath | 214/650 SG X |
| 3,447,704 | 6/1969 | Guilbert, Jr. | 214/95 R |
| 3,632,001 | 1/1972 | Richens et al. | 214/730 |
| 3,776,396 | 12/1973 | Burt et al. | 214/8.5 G X |
| 3,805,974 | 4/1974 | Andersson et al. | 214/16.1 CF X |
| 3,926,322 | 12/1975 | Scott | 214/305 |

FOREIGN PATENTS OR APPLICATIONS 1,292,581  4/1969  Germany ...................... 214/16.4 A Primary Examiner—L. J. Paperner
Assistant Examiner—Lawrence E. Williams
Attorney, Agent, or Firm—Andrew R. Basile

[57] ABSTRACT

The invention relates to a depalletizer for transferring tiers of goods from a pallet onto a take-off surface.

The depalletizer incorporates a vertically movable platform which may sequentially be brought into alignment first with a tier of goods and then with the take-off surface. Transfer means movable with the platform first push a tier of goods from a pallet onto the platform and then from the platform onto the take-off surface.

5 Claims, 1 Drawing Figure

U.S. Patent June 28, 1977 4,032,021
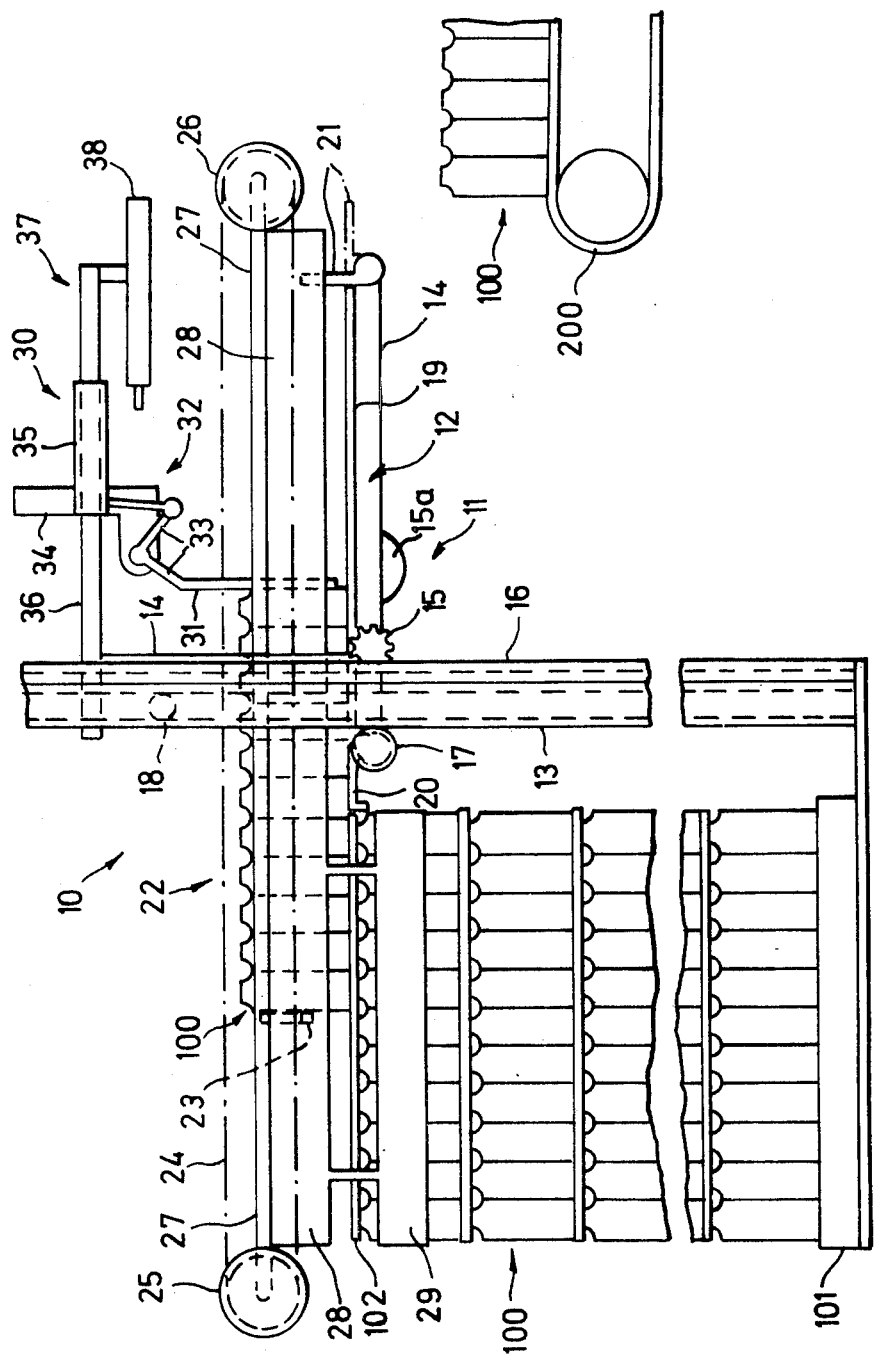

DEPALLETIZERS

This invention relates to a depalletiser, that is to say, a machine for unloading tiers of goods from a pallet and in particular to a machine for transferring tiers of goods from a pallet onto a take-off surface.

Usually, pallets loaded with tiers of goods have removable inserts separating adjacent tiers so that each tier can be unloaded in its entirety without disturbing the tier below. This is convenient were bulk goods destined for a factory production line are concerned, as the goods can be mechanically unloaded and transferred to a conveyor feeding the production line or to an accumulating table or other form of take-off surface.

In unloading pallets loaded in this fashion, it is necessary to compensate for the differences between the levels of the individual tiers and the level of the take-off surface. In conventional depalletisers, this has been achieved by the provision of a conveyor designed to communicate with all of the tiers and with the take-off surface, or by elevating the loaded pallet in a series of steps to bring successive tiers to the level of the take-off surface. The first of these systems has the disadvantage of occupying an appreciable amount of factory space and the second system requires expensive lifting equipment to be capable of supporting a full pallet load. The second system also requires the take-off surface to be at least as high as the uppermost tier of the pallet. This very often, is much greater than the height of a factory line so that additional equipment is required to lower the tiers of goods to the level of the factory lines.

The present invention seeks to provide a depalletiser for unloading pallets that mitigates at least some of the foregoing disadvantages.

According to the invention, there is provided a depalletiser for unloading tiers of goods from a pallet onto a take-off surface, comprising a vertically movable platform, lift means for aligning the platform sequentially with the individual tiers and with the take-off surface, and transfer means movable with the platform for transferring the goods of succesive tiers from the pallet to the platform when the platform is aligned with each respective tier and from the platform to the take-off surface when the platform is aligned with the take-off surface.

Preferably, the transfer means comprises a bar extending transversely of the platform and operable to sweep the goods onto and off the platform.

Conveniently, this bar may be carried between two rotatably driven endless chains arranged one on each side of the platform.

Preferably again, the depalletiser may include means for supporting the tier of goods immediately below the tier with which the platform is aligned, and, if desired, means may be provided for guiding and stabilizing the goods of each tier during transfer thereof onto the platform.

A preferred embodiment of the invention will now be described, by way of example, with reference to the accompanying drawing which is a schematic side elevation of a depalletiser of the invention.

In the drawing, a depalletiser, which is generally designated 10, is arranged to unload goods 100 from a pallet 101 onto a take-off conveyor 200 which feeds a production line. The goods 100, which in a typical case may comprise a bulk shipment of bottles or jars to be filled on the production line, are stacked in tiers on the pallet 101, with adjacent tiers separtaed by a removable insert 102.

The depalletiser is provided with a vertically movable gantry 11 consisting of a platform 12 supported between two upright channel section posts 13 spaced sufficiently apart to accommodate the tiers of goods to be unloaded.

The platform 12 is carried by a frame 14 which carries a motor 15a, the motor 15a being coupled by a suitable transmission including an overload clutch to two pinions 15 arranged on a common shaft. The pinions 15 extend one on each side of the frame 14 and engage with respective racks 16; each provided along one exterior side of a respective post 13. In this manner, by actuation of the motor 15a, the gantry 11 may move together with the motor up and down the posts 13. The frame 14 is guided relative to the posts 13 by two pairs of rollers 17 and 18 which rotatably mounted on the frame and which respectively engage the exterior sides of the posts 13 and the side of the channel defined by the posts 13. In this manner, the platform 12 remains horizontal as it moves up and down the posts 13.

The platform 12 consists of a horizontal plate 19 rigidly secured to the frame and two flaps 20 and 21. The flap 21 is pivotable about a horizontal axis between a vertical and a horizontal attitude. When vertical, the flap 21 acts as a stop for the goods on the platform and also allows clearance so that the platform 12 may move, without interference, past the conveyor 200. When the platform 12 is level with the conveyor 200, the flap 21 is lowered into a horizontal position by pneumatic jack (not shown) so that the goods may be transferred smoothly onto the take-off conveyor 200.

The flap 20 is horizontally slidable between a position where it overlies the fixed plate 19 and a second position where it extends to the left (as viewed) into abutment with one of the inserts 102. The flap 20 is also movable by a pneumatic jack and may either be retracted so that the platform may move without interfering with the pallet load or be displaced to the left to provide a smooth continuous surface over which the goods may be slid.

Means 22 are provided for transferring the goods from the pallet 101 onto the platform 12 which means move with the gantry 11 and comprise two arms 27 arranged one on each side of the platform and forming part of the frame 14. Each arm 27 supports at each end a sprocket 25, 26 over which is passed an endless chain 24. The endless chains 24 arranged one on each side of the platform 19 support between them a bar 23 serving to sweep the goods 100 from the insert 102 onto the platform 12. With the exception of the bar 23, no member extends transversely of the portions of two arms 27 lying to the left of the posts 13, as viewed. Consequently, once the bar 23 has moved to the right to a sufficient extent to clear the pallet 101, the pallet may be moved, withdrawn or replaced from its position on the base of the depalletiser without any interference from the moving gantry 11.

The moving gantry 11 further comprises a pair of spaced apart parallel lateral guide plates 28 located between the chains 24 above the loading surface of the platform 12. The guide plates 28 extend substantially the full length of the chains 24 and are arranged to guide the tiers of goods 100 during transfer from the pallet insert 102 to th platform 12. In order that the guide plates may not present an obstruction to the passage of the bar 23, the bar is connected at its ends to respective ones of the chains 24 by means of inverted U-shaped links which clear the guide plates.

In transferring goods from a relatively unsteady stack, it is preferable to support the tier of goods immediately below that being transferred onto the platform 12. In the described embodiment, a second pair of parallel guide plates 29 depending from the frame 14 and in vertical alignment with the first pair of guide plates 28, are disposed at a suitable distance below the platform 12. The guide plates 29 are movable by an actuator (not shown) so as to grip the next to uppermost tier of goods and steady the stack during transfer. The guide plates 29 serve the additional function of easing into place any bottles which may have come slightly out of alignment.

In the case where the goods 100 are inherently unstable, as for example with tall bottles having small bases, te balance of the goods in a moving tier is further assisted by a steadying bar placed in front of the tier. To this end, the depalletiser includes a steadying bar mechanism generally designated 30 which includes a pivotable member 31 extending transversely of the platform above the loading surface and carried by a pneumatically controlled linkage 32 which is mounted on the frame for free slidable movement longitudinally of the platform 12.

The linkage 32 consists of a bell-crank lever 33 connected between the member 31 and the ram of a pneumatic jack 34 which is supported by a carriage 35 sleeved on a pair of parallel rails 36 of a sub-frame 37 extending from the frame 14. Longitudinal travel of the carriage 35 is limited by a second pneumatic jack 38 which is rigidly mounted on the sub-frame and actuable to move the carriage in a return direction.

The member 31 is pivotable between a vertical and a horizontal attitude, its height in the latter case being sufficient to clear the tops of any goods on the platform.

The electric motor 15a and a further motor (not shown) driving the chains 24, are controlled by proximity switches in a control circuit for the selection input and output platform levels and for actuation of the transfer means 22 to shift the goods onto and off the platform 12, as appropriate. Control of the pneumatic operation of the platform flaps and the steadying bar mechanism 30 is incorporated in the control circuit so that the depalletiser carries out a continuous sequence of unloading cycles with each pallet automatically. It is believed that the design of the control circuit will be self-evident to anybody skilled in the art and will therefore not be described in detail.

In operation of the depalletiser 10, the pallet 101 having tiers of goods 100 separated by insert 102 is positioned on a loading tray constituted by the base of the depalletiser. In each unloadisng cycle, the flap 20 is retracted and flap 21 is raised to provide clearance for vertical travel of the platform 12 and the frame 14. The platform 12 is elevated by the rack and pinion 15, 16 to the level of the uppermost tray of the full pallet, during which time the bar 23 of the transfer means 22 resides in the sector of the chains 24 remote from the pallet and the member 31 is held in a position substantially parallel with the platform at the end of its travel remote from the return jack 38.

At the required level, as may be determined by a suitable photo-electric circuit, the flap 20 is moved to the left by its pneumatic jack so as to form a bridge between the plate 19 and the insert 102 bearing the uppermost tier of goods. The motor drive of the chain 24 is commenced so that the bar 23 is carried above the goods 100 into the sector of the pallet. The member 31 is then pivoted down by means of the linkage 32 so as to rest against the uppermost tier of goods on the front row of the tier facing the platform.

With continuing rotation of the chains 24, the bar 23 comes into contact with the rear of the tier and pushes the entire tier over the flap 20 and onto the plate 19; the goods being guided during this movement by the lateral guide plates 28. In addition, the tier of goods directly below the uppermost tier is secured against disturbance by the gripping action of the guide plates 29.

As the uppermost tier moves towards and onto the plate 19, it carries with it the member 31 steadying the front row of the goods; the carriage 35 sliding freely on the rails 36 of the sub-frame 37. At the limit of travel of the carriage, the member 31 is automatically raised by the linkage 32 clear of the goods on the platform.

Movement of the tier of goods is continued until the bar 23 has traversed the flap 20 and the load is arrested by the raised vertical flap 21 serving as a stop, the drive of the chains 24 being simultaneously discontinued.

The flap 20 is then retracted so as to place the loaded platform in a condition to be lowered to the level of the take-off surface of the conveyor 200, at which level the platform is automatically stopped by a proximity switch and the flap 21 is lowered to form a bridge between the plate 19 and the surface of the take-off conveyor 200. Rotation of the chains 24 may then be recommenced so that the goods are moved off the platform by the bar 23 and onto the conveyor 200. When the load has been discharged, the flap 21 is restored to its vertical attitude and the platform is elevated to the reduced level of the tier now uppermost on the pallet, the insert supporting the previous uppermost tier having been withdrawn manually. If desired, this latter operation may be carried out automatically.

During this time rotation of the chains 24 is continued to shift the bar 23 to a position in the uppermost segment of the chains close to the flap 20 and the carriage return jack 38 is actuated to restore the carriage 35 to its position adjacent the pallet in readiness for the next unloading cycle.

At the required level of the platform, the depalletiser is automatically recycled to complete unloading of the remaining tiers of the pallet, the cycle being performed, in a typical case, at the rate of 3 per minute.

After the lowermost tier has been transferred onto the conveyor 200, it being noted upon this occasion the tier is raised and not lowered to the level of the conveyor 200, a new pallet 101 is placed in position. It is not necessary to wait until transfer of the goods has taken place from the platform to the conveyor belt for once the lowermost tier has been transferred onto the platform 19 the pallet 101 may be removed without interfering with the operation of the depalletiser. This reduces to a minimum the time that the depalletiser stands idle waiting for a new pallet load. If at any stage in the cycle, the platform should reach the end of its travel or become jammed for any other reason, the overload clutch in the transmission between the motor 15a and the pinions 15, prevents damage to the motor 15a.

Usually, in an unloading operation, the front row of goods of each tier being transferred to the conveyor or to any other take-off surface, would be stabilized by the last row of goods of the preceding tier. In circumstances where this is not possible and the goods concerned are unstable during movement, supplementary support means similar to the steadying bar mechanism 30 may be provided on the conveyor 200 and may be controlled through the control circuit of the depalletiser.

It is envisaged that the conveyor 200 in the case of a slow factory line may have the form of a belt extending at right angles to the sweep of the goods of the platform 19. In this manner, the goods are transferred onto the conveyor row by row and the platform 19 acts as an accumulator table for the slow moving conveyor belt thereby offering a further reduction of the necessary factory space.

It is further envisaged that the depalletiser may be programmed to operate automatically in conjunction with a pallet in the conveyor as well as with various arrangements of take-up conveyors and and accumulating tables. Associated automatic equipment may be provided for any necessary processing of the pallet prior to unloading.

We claim:

1. A depalletiser for unloading tiers of goods from a pallet onto a take-off surface, said pallet having an uppermost tier, said depalletiser comprising vertical support means; a horizontal platform supported by said vertical support means; lift means for displacing said platform vertically up and down the support means so as to sequentially aline the platform with the uppermost tier on the pallet and with the take-off surface and transfer means movable with the platform for displacing tiers of goods from the pallet onto the platform and from the platform onto the take-off surface; and means movable with the platform for locating about the tier of goods immediately below the uppermost tier on the pallet so as to steady the stack of goods on the pallet during transfer of the uppermost tier.

2. A depalletiser as claimed in claim 1, further comprising a stabilizing means adapted to be urged against a selected portion of a tier being transferred and freely slidable parallel to the platform whereby to steady said selected portion of a tier against toppling.

3. A depalletiser as claimed in claim 1, wherein the platform is formed with a retractable end flap on each end, each flap being extendable to positions wherein said flaps may serve as bridges for smooth transfer of the goods onto, and off, the platform, respectively.

4. A depalletiser as claimed in claim 1, wherein the transfer means comprises a bar extending transversely of the platform and carried by a pair of endless chains disposed one on each side of the platform.

5. A depallestiser as claimed in claim 1, wherein lateral guide means are provided above the level of the platform for stabilizing and guiding the tiers of goods during transfer.

* * * * *